US008348331B2

(12) United States Patent
Holt

(10) Patent No.: US 8,348,331 B2
(45) Date of Patent: Jan. 8, 2013

(54) CARGO MANAGEMENT SYSTEM FOR PICK-UP TRUCKS

(75) Inventor: Laurence J Holt, Uxbridge (CA)

(73) Assignee: Multimatic Inc., Markham (CA)

( * ) Notice: Subject to any disclaimer, the term of this patent is extended or adjusted under 35 U.S.C. 154(b) by 169 days.

(21) Appl. No.: 12/990,297

(22) PCT Filed: Apr. 16, 2009

(86) PCT No.: PCT/CA2009/000504
§ 371 (c)(1),
(2), (4) Date: Oct. 29, 2010

(87) PCT Pub. No.: WO2009/132422
PCT Pub. Date: Nov. 5, 2009

(65) Prior Publication Data
US 2011/0042990 A1    Feb. 24, 2011

(30) Foreign Application Priority Data
May 2, 2008    (CA) ..................................... 2630266

(51) Int. Cl.
*B60R 9/06* (2006.01)
(52) U.S. Cl. ........ 296/183.1; 296/3; 296/37.6; 410/130; 224/403
(58) Field of Classification Search ........... 296/3, 183.1, 296/37.6; 410/130, 139; 224/403, 404
See application file for complete search history.

(56) References Cited

U.S. PATENT DOCUMENTS

| | | | |
|---|---|---|---|
| 3,664,704 A | 5/1972 | Ellis | |
| 4,256,425 A | 3/1981 | Burgess et al. | |
| 4,650,383 A | 3/1987 | Hoff | |
| 4,772,165 A | 9/1988 | Bartkus | |
| 5,139,375 A * | 8/1992 | Franchuk | 410/105 |
| 5,427,487 A | 6/1995 | Brosfske | |
| 5,494,327 A | 2/1996 | Derecktor | |
| 5,899,544 A | 5/1999 | James et al. | |
| 5,924,616 A * | 7/1999 | Shives | 224/404 |
| 5,988,722 A * | 11/1999 | Parri | 296/26.09 |
| 6,481,604 B1 | 11/2002 | Beene et al. | |

(Continued)

OTHER PUBLICATIONS

"PCT International Search Report dated Jun. 14, 2009 for PCT/CA2009/000504, from which the instant application is based," 2 pgs.

*Primary Examiner* — Glenn Dayoan
*Assistant Examiner* — Gregory Blankenship
(74) *Attorney, Agent, or Firm* — Fredrikson & Byron, PA

(57) ABSTRACT

A structural attachment system for a cargo management system is fully integrated into the cargo bed side walls of a pick-up truck so that the only feature that is different than a standard pick-up is an array of holes along the top of the cargo bed side walls. The cargo management system also includes a wide range of different pick-up truck cargo bed mounted accessories that incorporate structural hooks that are adapted to be retained and released by the structural attachment system. Additionally, the structural attachment system provides a single point, simple method of retention and release via an actuation handle at the rear most point of the pick-up truck cargo bed. The configuration of the structural attachment system allows significant structural retention forces to be transferred from the accessories into the pick-up truck cargo bed side walls via the structural hooks.

14 Claims, 10 Drawing Sheets

U.S. PATENT DOCUMENTS

| | | |
|---|---|---|
| 6,846,140 B2 | 1/2005 | Anderson et al. |
| 6,971,828 B2 * | 12/2005 | Bernardo ................ 410/135 |
| 7,243,968 B2 * | 7/2007 | Kiester et al. ............ 296/37.6 |
| 7,494,171 B2 * | 2/2009 | Martin et al. ............ 296/37.6 |
| 7,731,026 B2 * | 6/2010 | Harrison ................ 206/349 |
| 7,819,295 B2 * | 10/2010 | Plavetich ................ 224/403 |
| 2006/0222471 A1 * | 10/2006 | Lussier ................ 410/130 |
| 2011/0042990 A1 * | 2/2011 | Holt ................ 296/37.6 |

* cited by examiner

CARGO MANAGEMENT SYSTEM FOR PICK-UP TRUCKS

Related Applications

This application is a 35 U.S.C. 371 national stage filing from International Application No. PCT/CA2009/000504 filed Apr. 16, 2009, which claims priority to Canadian Patent Application No. 2,630,266, filed May 2, 2008, the teachings of which are incorporated herein by reference.

FIELD OF THE INVENTION

This invention relates to a cargo management system for pick-up trucks and more specifically to a structural attachment system that facilitates the retention of a wide range of accessories in the pick-up cargo bed.

BACKGROUND OF THE INVENTION

Pick-up truck cargo bed mounted accessories are common and encompass a wide range of applications such as bike racks, tool boxes, bed dividers, tonneau covers, camper tops, cab window guards, load tie-downs and the like. These accessories significantly increase the utility of pick-up trucks and are available from both the original equipment manufacturers of the pick-up trucks and from a large number of aftermarket sources. Despite this widespread availability, a standard method of attachment of the accessories to the pick-up truck cargo bed has never been adopted. Many of the available accessories, such as tonneau covers and camper tops, are deemed semi-permanent and are rigidly bolted to the pick-up truck's cargo bed side walls. This semi-permanent attachment significantly reduces the flexibility of adding alternative accessories. For example, it would be a major undertaking to install a bike rack if a tonneau cover was already in place.

Pick-up truck cargo bed mounted accessories that are considered temporary, like bike racks or bed dividers, utilize a large number of attachment methodologies that range from simple friction clamps, through individual threaded clamps, to rail and clamp systems. Rail and clamp systems were developed much later than simple friction clamps and individual threaded clamps but have now become a common approach to accessory attachment. There are numerous rail and clamp systems described in the art; some are utilized by the original equipment manufacturers and some are available from aftermarket sources. Although original equipment manufacturers tend to standardize on a rail and clamp system for use in their pick-up trucks, there is no commonality between original equipment manufacturers and there are a large number of different configurations in the aftermarket industry. Additionally, the available rail and clamp systems all suffer deficiencies of one type or another.

The prior art discloses numerous approaches to providing a system solution to attaching accessories to pick-up truck cargo beds. U.S. Pat. No. 3,664,704 to Ellis describes an integrated system of accessory components for pick-up truck bodies which are tailored to utilize the minimum possible space in the truck body while providing maximum convenience and usefulness in the storage of tools, fuels and the like. The accessory components are tied together and anchored to the truck body in such a way that undesirable shifting or displacement of components is eliminated. Although U.S. Pat. No. 3,664,704 describes a system solution to attaching accessories to a pick-up truck, the mounting approach consists of conventional bolting either directly to the pick-up body or to a system of tie rails. The mounting and dismounting of accessories in this prior-art configuration would be a difficult and time-consuming undertaking.

U.S. Pat. No. 5,494,327 to Derecktor describes a rail and clamp type system that consists of a sliding connection especially suited for releasably and adjustably attaching an overhead rack or the like to side walls of a pick-up truck. The sliding connection comprises a track mountable on a side wall of the pick-up truck and a sliding lock member that can be adapted to support equipment, such as overhead racks, a cap, a tonneau cover, load holding devices, tool boxes, vices, saws and the like. In this manner the prior art of U.S. Pat. No. 5,494,327 solves the mounting and dismounting limitations of U.S. Pat. No. 3,664,704 by introducing a rail and clamp type arrangement that simplifies attachment by eliminating the requirement of conventional bolting. However, the sliding connection of U.S. Pat. No. 5,494,327 is not fully integrated into the structure of the pick-up truck as the track is mounted outside of the side wall. Additionally, the sliding lock member clamps to the rail and does not offer a positively locked structural connection. A further limitation of U.S. Pat. No. 5,494,327 is that each accessory requires its own sliding lock member so that the user would be required to walk around or climb into the cargo bed to operate the system.

U.S. Pat. No. 6,481,604 to Beene et al. overcomes the mounting and dismounting limitations of U.S. Pat. No. 3,664,704 by eliminating the requirement of using conventional bolting to attach the accessories to the pick-up body. It also offers a single locking member which overcomes one of the limitations of U.S. Pat. No. 5,494,327 in that the operator does not have to walk around or climb into the cargo bed to operate the system. U.S. Pat. No. 6,481,604 describes a vehicle rack that includes a plurality of apertures which supports different accessories having mounting pegs on a pick-up truck bed. The vehicle rack also includes a plurality of retaining arms wherein each of the plurality of retaining arms is received within a stake pocket of the pick-up truck bed. In this way U.S. Pat. No. 6,481,604 provides a vehicle rack which supports different accessories having mounting pegs on a pick-up truck bed and allows the vehicle rack to be easily mounted and removed from the bed of the pick-up truck. However, the accessory mounting system of U.S. Pat. No. 6,481,604 is not fully integrated into the structure of the pick-up truck and is adapted to be removed when not in use. A further limitation of the cargo management system of U.S. Pat. No. 6,481,604 is that it does not facilitate the attachment of full width, rigid accessories as the mounting pegs would obstruct the installation access on two racks simultaneously.

Another rail and clamp type system is described in U.S. Pat. No. 6,846,140 to Anderson et al. which substantially overcomes the integration limitations of the previously referenced prior art. U.S. Pat. No. 6,846,140 describes a flexible cargo bed tie-down system that allows the user to easily change, adjust, customize, and adapt his or her vehicle to specific needs at any given moment, and that interfaces with the rest of the truck in an optimum manner from a functional, structural, and aesthetic standpoint. Single or multiple tie-down tracks integral with the body of the truck are provided such that the exterior contour of the tracks do not extend appreciably beyond the contour of the adjacent portion of the body. In this way, U.S. Pat. No. 6,846,140 offers a fully integrated system. Additionally, U.S. Pat. No. 6,846,140 claims that the body and tracks are specifically designed to take large loads but the structural capability of the system is actually limited by its attachment fittings. Each accessory requires its own attachment fittings and so U.S. Pat. No. 6,846,140 suffers the same limitation as U.S. Pat. No. 5,494, 327 in that the user would be required to walk around or climb into the cargo bed to operate the system.

GENERAL DESCRIPTION OF THE INVENTION

Accordingly, it would be advantageous to provide a cargo management system for pick-up trucks that facilitates the retention of a wide range of accessories, is fully integrated into the cargo bed, provides a single point, simple method of retention and release, and is capable of providing the highest possible level of structural retention. An object of the present invention, therefore, is to provide a fully integrated cargo management system for pick-up trucks that allows the attachment of every conceivable accessory via one common interface. This includes semi-permanent accessories such as tonneau covers and camper tops as well as temporary installations like bicycle racks or bed dividers. By concealing the main components of the structural attachment system within the cargo bed side walls the cargo management system of the present invention is a fully integrated arrangement. A further object of the structural attachment system of the present invention is to provide a single point of retention and release actuation at the rear most point of the cargo bed side walls. In this way the installation and removal of accessories is significantly simplified, generally does not require the operator to enter the cargo bed and avoids improperly secured loads. The structural attachment system of the present invention also significantly increases the retention load threshold over the prior art arrangements by providing discrete locking apertures that create a positive structural interlock with each accessory.

The structural attachment system of the present invention structurally integrates a castellated retention rail within the top of the pick-up truck cargo bed side wall. The castellated retention rail extends the length of the cargo bed, is of a constant cross-section and incorporates locking apertures at predetermined intervals along its length that align with corresponding holes in the top of the cargo bed side wall. In a preferred embodiment of the present invention, the castellated retention rail is manufactured from high strength steel using roll forming and is welded into the cargo bed side wall. The present invention also includes a sliding lock rail that is configured to fit within the castellated retention rail generally conforming to its cross-sectional shape while also extending the length of the cargo bed. The sliding lock rail is adapted to freely translate a predetermined distance parallel to the main axis of the castellated retention rail while being structurally restrained in all other degrees of freedom. The sliding lock rail incorporates slot features that are configured to close the locking apertures of the castellated retention rail when the sliding lock rail is at one extent of its translation and open the locking apertures at the opposite extent of its translation. The structural attachment system also includes a handle and linkage arrangement, located at the rear most point of the pick-up truck cargo bed side wall adapted to provide a user operated method of imparting the translation to the sliding lock rail through the predetermined distance. Additionally, the cargo management system of the present invention includes a range of different pick-up truck cargo bed mounted accessories that incorporate structural hooks adapted to be accepted by the locking apertures of the castellated retention rail. The locking apertures readily accept the structural hooks when open but structurally retain the structural hooks when closed.

In this manner, a structural attachment system for a cargo management system is fully integrated into the cargo bed side walls of a pick-up truck so that the only feature that is different than a standard pick-up, not equipped with the structural attachment system of the present invention, is the holes in the top of the cargo bed side walls. Additionally, the structural attachment system of the present invention provides a single point, simple method of retention and release via the actuation handle at the rear most point of the pick-up truck cargo bed and is capable of transferring significant structural retention forces from the accessories into the pick-up cargo bed side walls via the structural hooks. In a preferred embodiment of the present invention the pick-up truck cargo bed is furnished with a pair of castellated retention rails, a pair of sliding lock rails and a pair of actuation handles and linkage arrangements, each located within one of the two of the pick-up truck cargo bed side walls. In this preferred embodiment, accessories can be attached to opposite cargo bed side walls by at least one structural hook per side. In this way, accessories that are the width of the pick-up truck cargo bed, such as tool boxes and bed dividers can be retained by the structural attachment system of the present invention. The structural attachment system of the present invention has the capability to hold the entire weight of the pick-up truck off of the ground via two structural hooks.

In a preferred embodiment of the present invention, the pick-up truck cargo bed is provided with a tailgate that is adapted to rotate between an open position and a closed position and is configured with a pair of security pockets that interact with the outer end of the actuation handles when the tailgate is in its closed position so that the actuation handles are restrained from motion. In this way the structural attachment system of the present invention can be prevented from operation when locking apertures are closed and the structural hooks are fully retained. As the majority of pick-up truck tailgates are lockable via a key and latch system, the security pockets allow the structural attachment system to utilize this aspect of the vehicle's security.

Further aspects of the invention will become apparent from the following description.

DETAILED DESCRIPTION OF THE INVENTION

Figure 1:
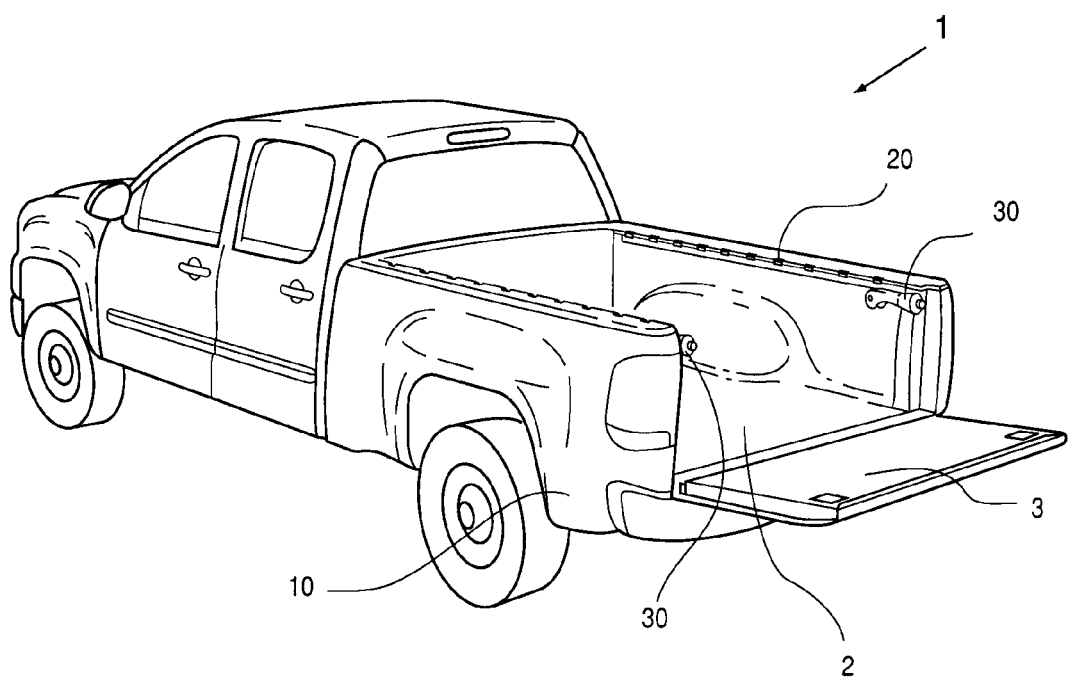
FIG. 1 is a perspective view of a pick-up truck with the inventive structural attachment system installed.
Figure 2:
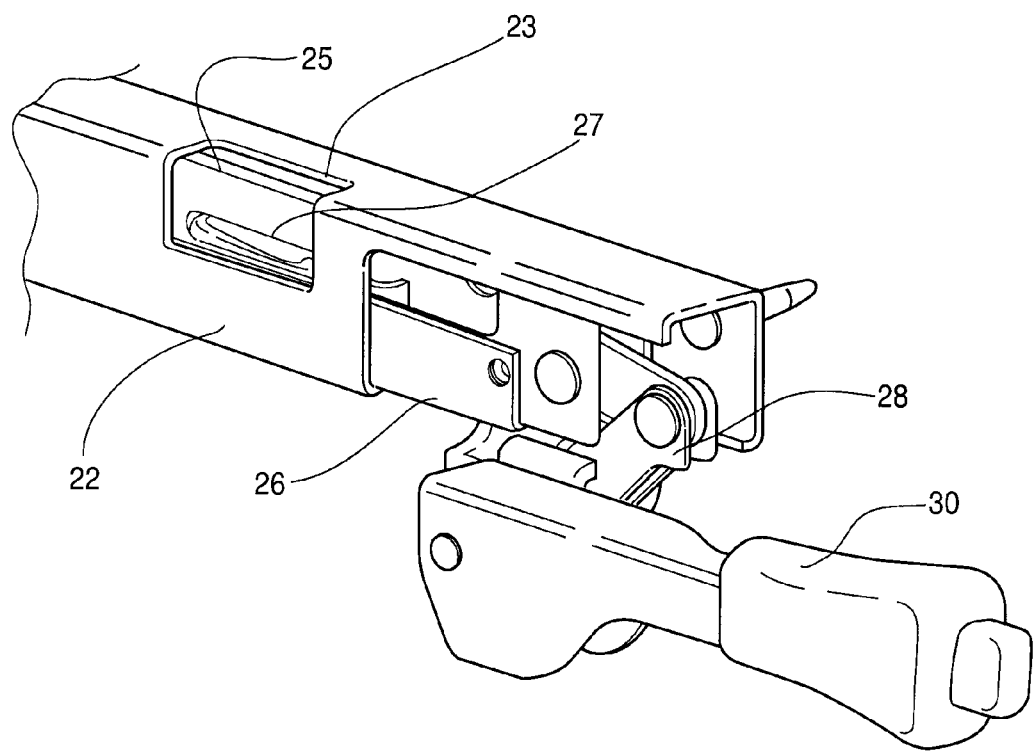
FIG. 2 is a partial cutaway perspective view of the mechanism of the inventive structural attachment system.
Figure 3:
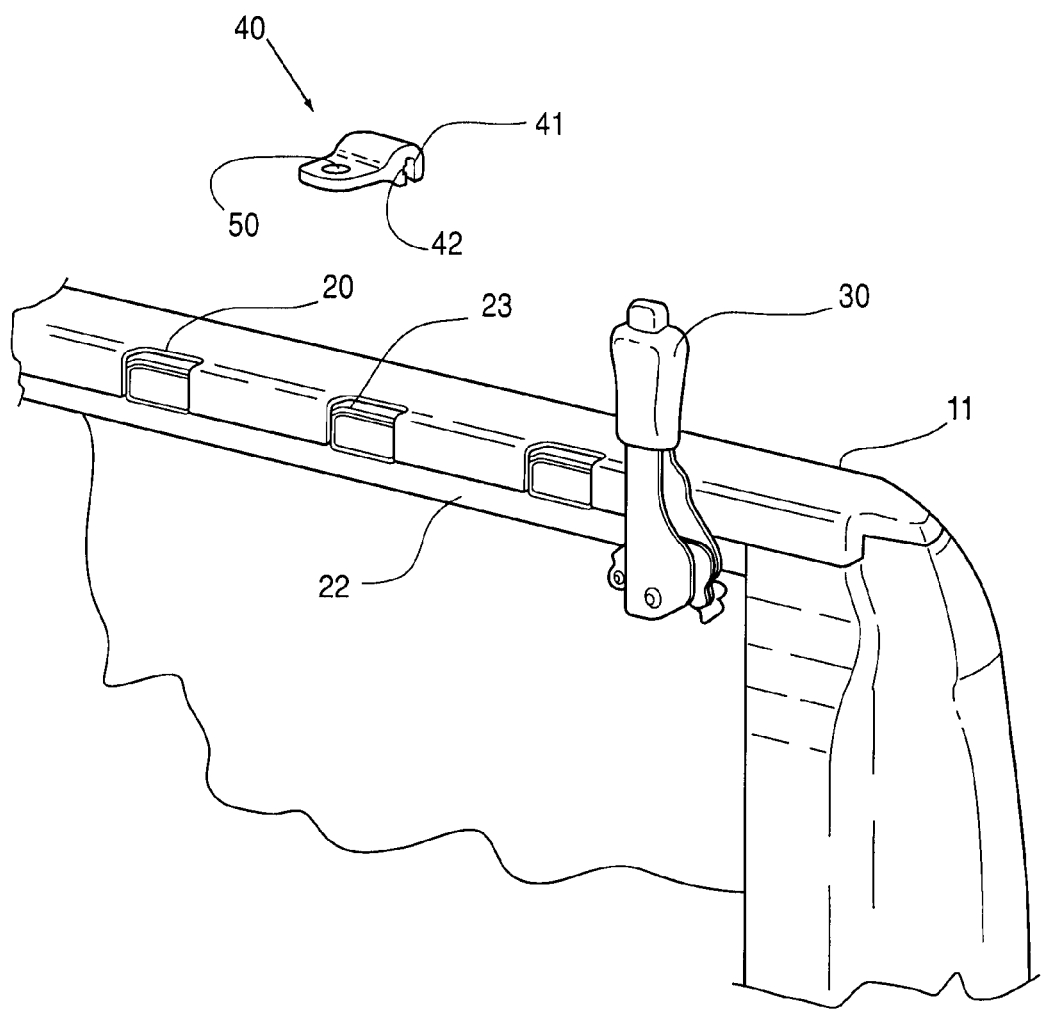
FIG. 3 is a perspective view of the of the inventive structural attachment system shown in its unlocked condition.

Referring to FIG. 1, a pick-up truck (1) includes a cargo bed (2), a tailgate (3) that is adapted to rotate between an open position and a closed position and a pair of cargo bed side walls (10)(11). The cargo bed side walls (10)(11) incorporate a plurality of cargo management access holes (20) along their top surfaces. These cargo management access holes (20) are equally spaced at predetermined intervals of approximately 150 mm and are of approximately 50 mm in length. Focusing on the right hand cargo bed side wall (11) for clarity and referring to FIGS. 1, 2 and 3, a castellated retention rail (22) is contained within the cargo bed side wall (11) and is rigidly attached to the cargo bed side wall (11) via bolting, welding, bonding, riveting or similar fastening means. The castellated retention rail (22) extends the length of the cargo bed (2), is of a constant cross-section and incorporates locking apertures (23) at predetermined intervals along its length that align with the cargo management access holes (20) of the cargo bed side wall (11). A sliding lock rail (25) is configured to fit within the castellated retention rail (22) generally conforming to its cross-sectional shape and extending the length of the cargo bed (2). The sliding lock rail (25) is adapted to freely translate a predetermined distance parallel to the main axis of the castellated retention rail (22) while being structurally restrained in all other degrees of freedom by an array of bearing pads (26) that are rigidly attached to the sliding lock rail (25) but are configured to slide on the inner surfaces of the castellated retention rail (22). The bearing pads (26) are manufactured from a plastic material possessing good compressive strength and a low coefficient of friction like mineral filled nylon or acetal. The sliding lock rail (25) incorporates slot features (27) that are configured to close the locking apertures (23) of the castellated retention rail (22) when the sliding lock rail (25) is at one extent of its translation, as illustrated in FIG. 2, and open the locking apertures at the opposite end of its translation, as illustrated in FIG. 3. An actuation handle (30) is configured to translate the sliding lock rail (25) through the predetermined distance via a linkage system (28). The linkage system (28) is configured so that the actuation handle (30) travels through 90 degrees to achieve the predetermined translation distance of the sliding lock rail (25). The linkage system (28) is additionally arranged so that the slot features (27) close the locking apertures (23) of the castellated retention rail (22) when the actuation handle (30) is horizontal and facing rearward, as illustrated in FIG. 2, and open the locking apertures (23) of the castellated retention rail (22) when the actuation handle (30) is vertical and facing upward, as illustrated in FIG. 3.

Figure 4:
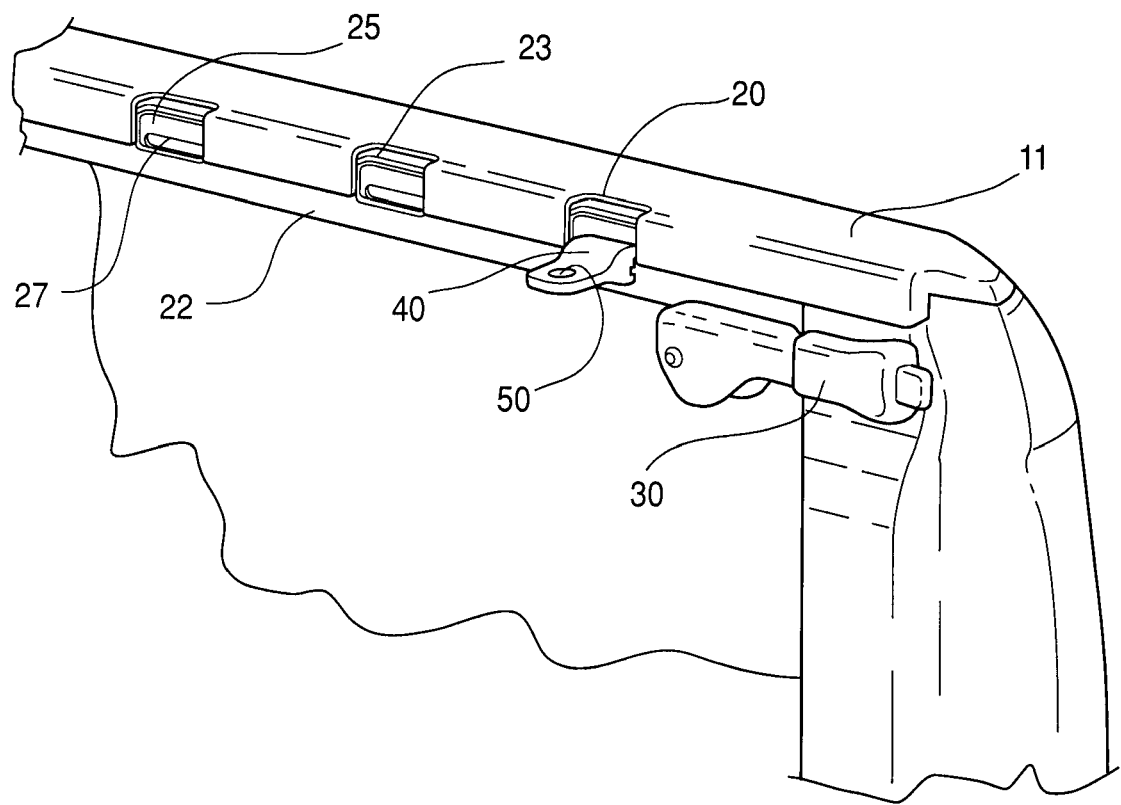
FIG. 4 is a perspective view of the of the inventive structural attachment system shown in its locked condition.

Referring to FIG. 3, a structural hook (40) is illustrated prior to installation. The actuation handle (30) is illustrated in its vertical orientation so that the slot features (27) of the sliding lock rail (25) have opened the locking apertures (23) of the castellated retention rail (22). The structural hook (40) includes a channel (41) and an isolation pad (42). The structural hook (40) as illustrated in FIG. 3 also includes a tie-down feature (50) adapted to accept a rope, strap hook or similar cargo retention means. The structural hook (40) is adapted to easily install into the locking apertures (23) and be temporarily retained by the channel (41) and isolation pad (42) interacting with the inner edge of the locking apertures (23) of the castellated retention rail (22). FIG. 4 illustrates the structural hook (40) installed into one of the locking apertures (23) and the actuation handle (30) is shown in its horizontal orientation so that the slot features (27) of the sliding lock rail (25) have closed the locking apertures (23) of the castellated retention rail (22). With the locking apertures (23) closed, the structural hook (40) is fully structurally retained in the castellated retention rail (22) and significant forces can be transferred from the tie-down feature (50) into the pick-up truck cargo bed side wall (11).

In this manner, a structural attachment system for a cargo management system is fully integrated into the cargo bed side wall (11) of the pick-up truck (1) so that the only feature that is different than a standard pick-up, not equipped with the structural attachment system of the present invention, is the cargo management access holes (20). Additionally, the structural attachment system of the present invention provides a single point, simple method of retention and release via the actuation handle (30) at the rear most point of the pick-up truck cargo bed and is capable of transferring significant structural retention forces from the structural hook (40) to the pick-up cargo bed side wall (11) via the castellated retention rail (22). In a preferred embodiment of the present invention the pick-up truck cargo bed is furnished with a pair of castellated retention rails (22), a pair of sliding lock rails (25), a pair of actuation handles (30) and a pair of linkage systems (28), each located within one of the two of the pick-up truck cargo bed side walls (10)(11). In this preferred embodiment, accessories can be attached to opposite cargo bed side walls (10) (11) by at least one structural hook (40) per side. In this way, accessories that are the width of the pick-up truck cargo bed, such as tool boxes and bed dividers can be retained by the structural attachment system of the present invention. The structural attachment system of the present invention has the capability to hold the entire weight of the pick-up truck (1) off of the ground via two structural hooks (40).

Figure 5:
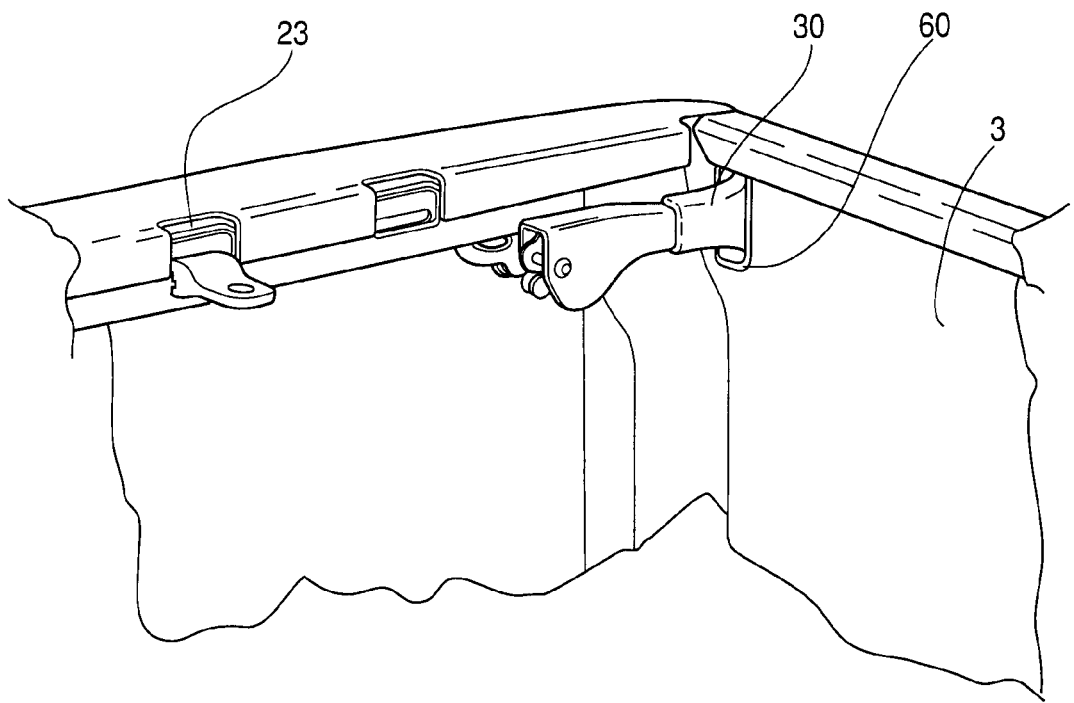
FIG. 5 is a perspective view of a preferred embodiment of the inventive structural attachment system shown in its locked condition.

FIG. 5, illustrates a preferred embodiment of the present invention in which the tailgate (3) includes a security pocket (60) configured to interact with the outer end of the actuation handle (30) when the tailgate (3) is in its closed position so that the actuation handle (30) is restrained from motion. In this way, the structural attachment system of the present invention can be prevented from operation when the locking apertures (23) are closed and all structural hooks (40) are fully retained. As the majority of pick-up truck tailgates are lockable via a key and latch system, the security pockets (60) allow the structural attachment system to utilize this aspect of the vehicle's security. In a preferred embodiment of the present invention the tailgate (3) contains a pair of security pockets (60).

Figure 6:
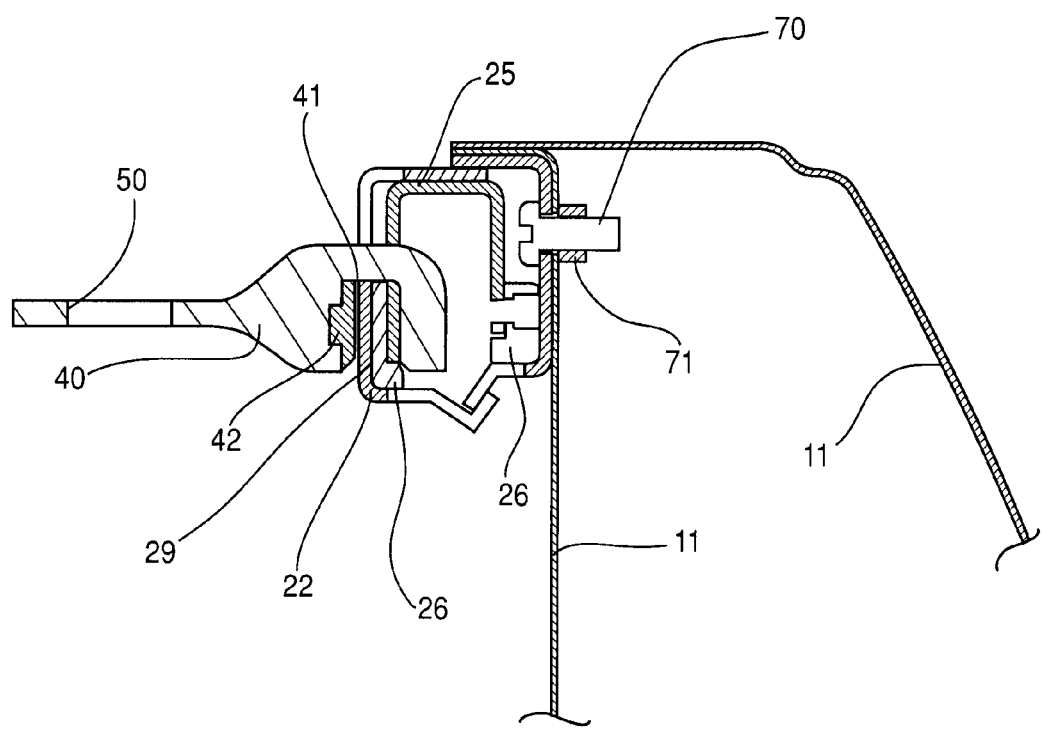
FIG. 6 is a cross-sectional view of the of the inventive structural attachment system taken perpendicular to the longitudinal axis of the pick-up truck cargo bed side wall.

FIG. 6 illustrates a section taken perpendicular to the main axis of the castellated retention rail (22) through one of the locking apertures (23). The structural attachment system is shown with the sliding lock rail (25) at the extent of its translation so that the locking apertures (23) are closed. The castellated retention rail (22) is rigidly attached to the cargo bed side wall (11) via a plurality of bolts (70) and weld nuts (71). The sliding lock rail (25) is adapted to freely translate parallel to the main axis of the castellated retention rail (22) while being structurally restrained in all other degrees of freedom by an array of bearing pads (26) that are rigidly attached to the sliding lock rail (25) but are configured to slide on the inner surfaces (29) of the castellated retention rail (22). A structural hook (40) is installed in the locking apertures (23) with its channel (41) and isolation pad (42) interacting with the inner edge of the locking aperture (23). The structural hook (40) includes a tie-down feature (50) adapted to accept a rope, strap hook or similar cargo retention means. With the locking apertures (23) closed the structural hook (40) is fully structurally retained in the castellated retention rail (22) and significant forces can be transferred from the tie-down feature (50) into the pick-up truck cargo bed side wall (11).

Figure 7:
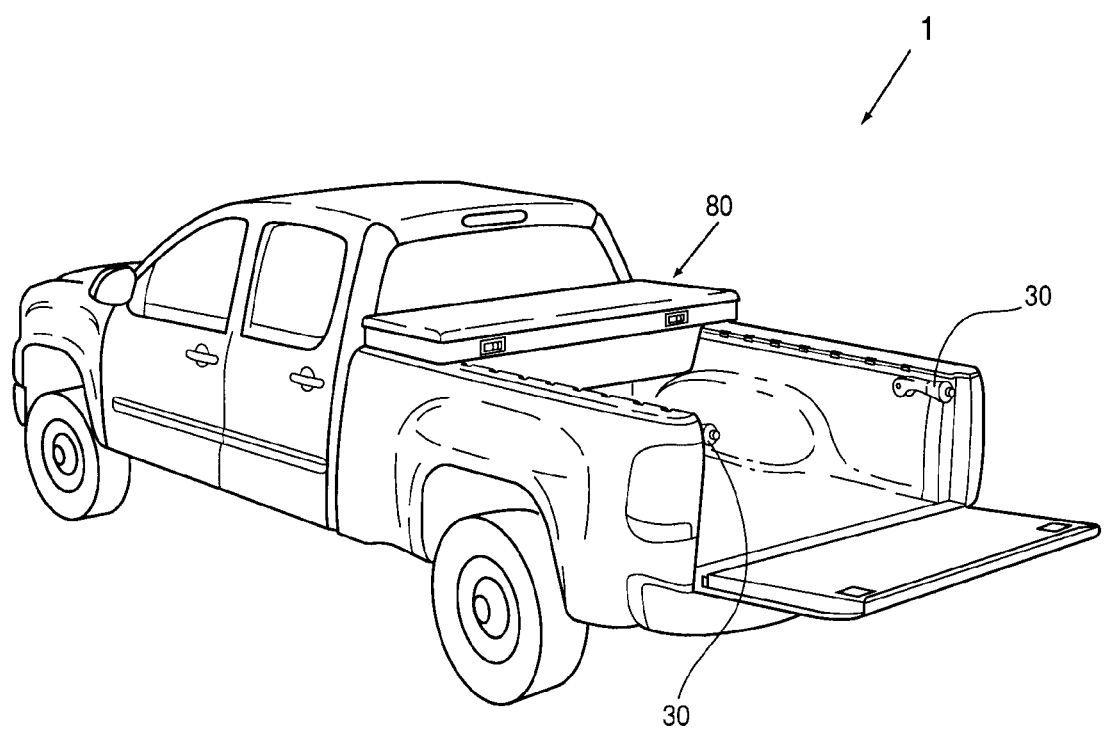
FIG. 7 is a perspective view of a pick-up truck with an accessory tool box installed and retained by the inventive structural attachment system.
Figure 8:
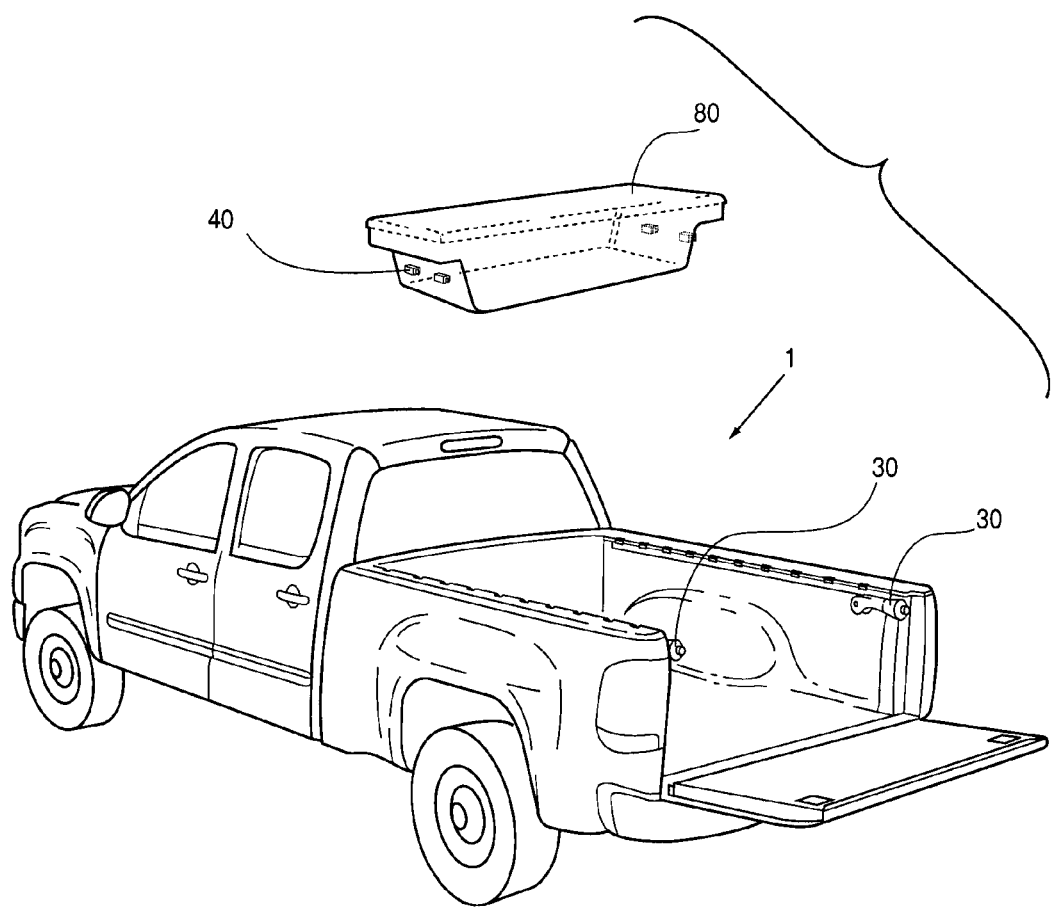
FIG. 8 is a perspective view of a pick-up truck with an accessory tool box removed from the inventive structural attachment system.

FIG. 7 illustrates a pick-up truck (1) that incorporates the structural attachment system of the present invention which is being used to retain an accessory tool box (80). The structural attachment system is integrated into both cargo bed side walls and the actuation handles (30) are shown in their horizontal orientation so that the system is in its locked condition. As illustrated in FIG. 8, the accessory tool box (80) is configured with four structural hooks (40) that allow it to be retained and released as previously described.

Figure 9:
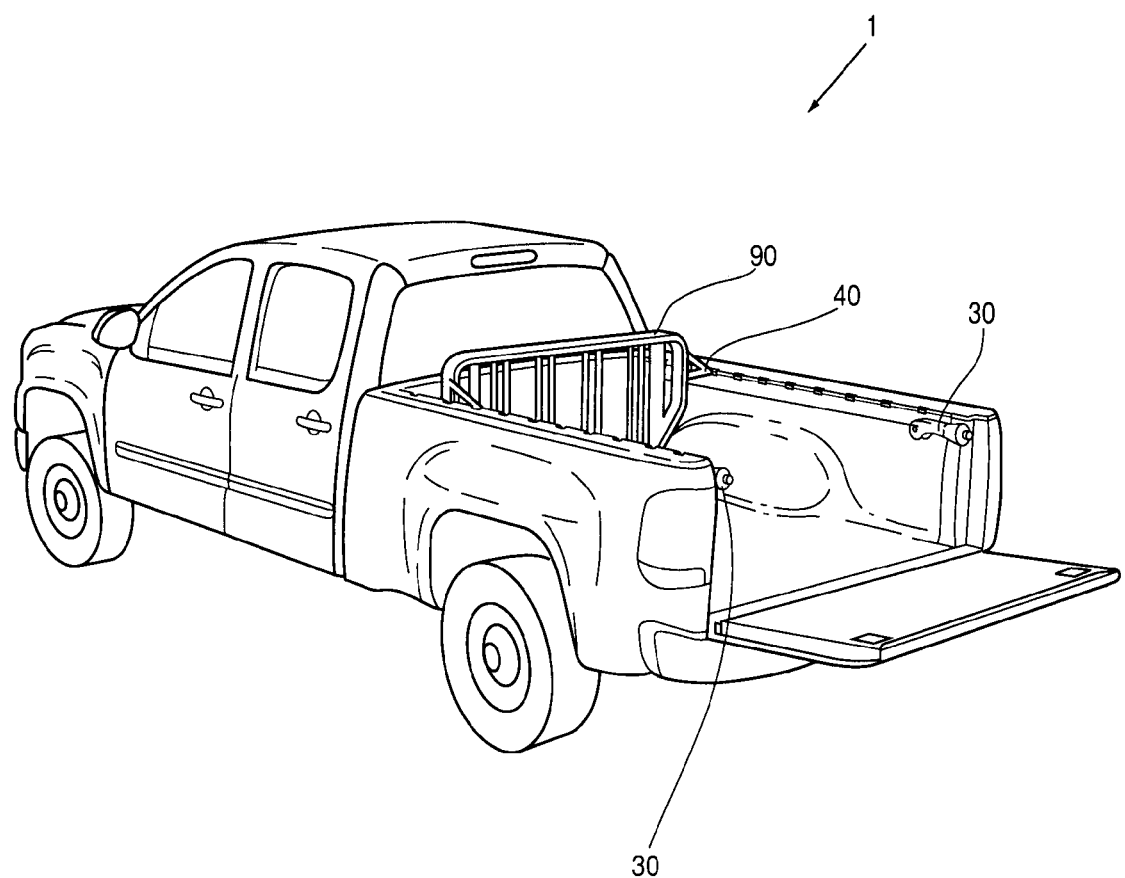
FIG. 9 is a perspective view of a pick-up truck with an accessory bicycle rack installed and retained by the inventive structural attachment system.

FIG. 9 illustrates a pick-up truck (1) that incorporates the structural attachment system of the present invention which is being used to retain an accessory bicycle rack (90). The structural attachment system is integrated into both cargo bed side walls and the actuation handles (30) are shown in their horizontal orientation so that the system is in its locked condition. Four structural hooks (40) are integrated into the accessory bicycle rack (90) that allows it to be retained and released as previously described.

Figure 10:
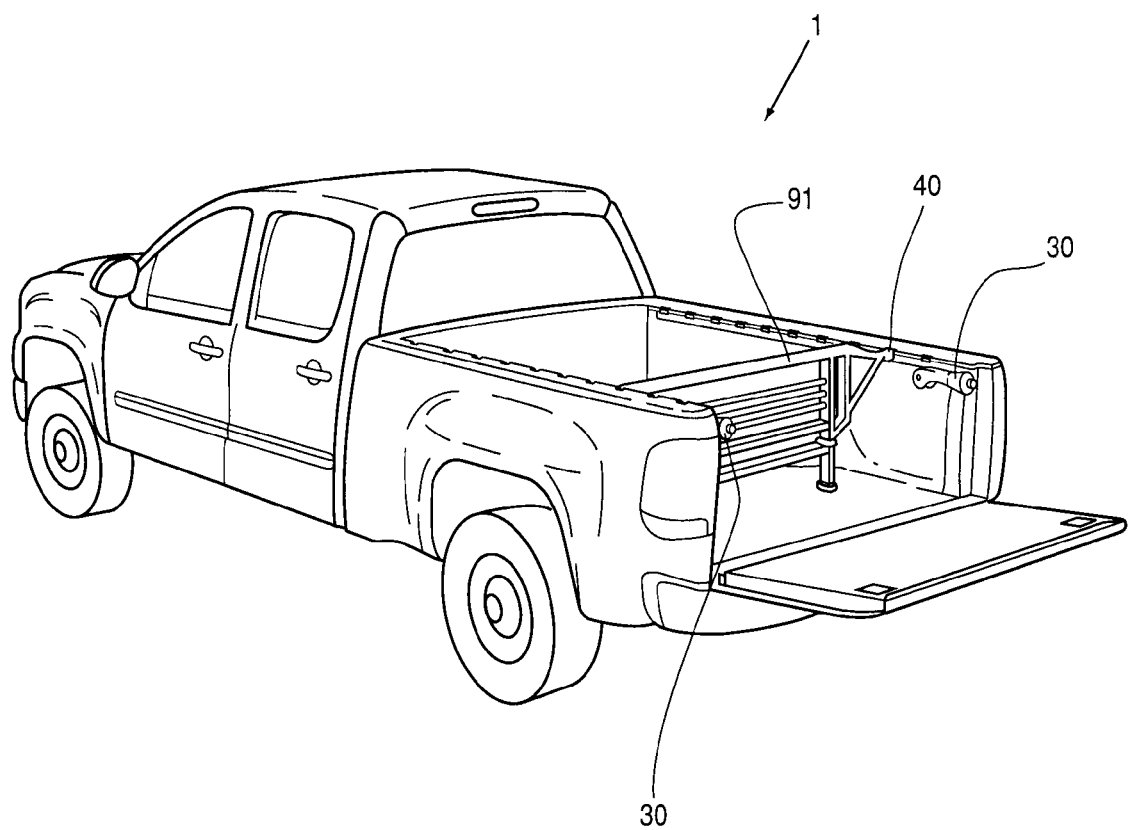
FIG. 10 is a perspective view of a pick-up truck with an accessory bed divider installed and retained by the inventive structural attachment system.

FIG. 10 illustrates a pick-up truck (1) that incorporates the structural attachment system of the present invention which is being used to retain an accessory bed divider (91). The structural attachment system is integrated into both cargo bed side walls and the actuation handles (30) are shown in their horizontal orientation so that the system is in its locked condition. Four structural hooks (40) are integrated into the accessory bed divider (91) that allows it to be retained and released as previously described.

The invention claimed is:

1. A structural attachment system for pick-up truck cargo beds comprising:
    a) a castellated retention rail running a length of the pick-up truck cargo bed and integrated with a top of a pick-up truck cargo bed side wall;
    b) the castellated retention rail being configured with locking apertures adapted to accept corresponding structural hooks;
    c) a sliding lock rail located within the castellated retention rail and adapted to freely translate a predetermined distance parallel to a main axis of the castellated retention rail while being structurally restrained in all other degrees of freedom;
    d) the sliding lock rail being adapted to structurally retain the structural hooks at a first extent of its translation and to allow release of the structural hooks at a second, opposite extent of its translation;
    e) an actuation handle and linkage arrangement adapted to provide a single point user-operated method of imparting the translation to the sliding lock rail through the predetermined distance;
    wherein the structural hooks are adapted to be integrated into a variety of different pick-up truck cargo bed mounted accessories to facilitate structural retention and simple release of the accessories via movement of the actuation handle.

2. The structural attachment system of claim 1, wherein the actuation handle and linkage arrangement are located at the rear most point of the pick-up truck cargo bed side wall.

3. The structural attachment system of claim 2, wherein the pick-up truck cargo bed is provided with a tailgate that is adapted to rotate between an open position and a closed position and is configured with a security pocket that is adapted to interact with the actuation handle so that the structural attachment system is prevented from operation when the pick-up truck tailgate is in its closed position.

4. The structural attachment system of claim 1, wherein the castellated retention rail is rigidly attached to the cargo bed side wall via bolting, welding, bonding, or riveting.

5. The structural attachment system of claim 1, wherein the sliding lock rail is structurally restrained in all degrees of freedom other than parallel to the main axis of the castellated retention rail by bearing pads.

6. The structural attachment system of claim 5, wherein the bearing pads are manufactured from a plastic material.

7. The structural attachment system of claim 1, wherein the sliding lock rail incorporates slot features that are configured to close the locking apertures to structurally retain the structural hooks.

8. The structural attachment system of claim 1, wherein the pick-up truck cargo bed is furnished with a pair of castellated retention rails, a pair of sliding lock rails and a pair of actuation handles and linkages, each located within one of two pick-up truck cargo bed side walls.

9. The structural attachment system of claim 6, wherein the bearing pads are manufactured from a mineral filled nylon or acetal.

10. A structural attachment system for pick-up truck cargo beds comprising:
    a) a castellated retention rail running a length of the pick-up truck cargo bed and integrated with a top of a pick-up truck cargo bed side wall;
    b) the castellated retention rail being rigidly attached to the cargo bed side wall via bolting, welding, bonding, or riveting and being configured with locking apertures adapted to accept corresponding structural hooks;
    c) a sliding lock rail located within the castellated retention rail and adapted to freely translate a predetermined distance parallel to a main axis of the castellated retention rail while being structurally restrained in all other degrees of freedom by bearing pads manufactured from a plastic material;
    d) the sliding lock rail incorporating slot features that are configured to close the locking apertures to structurally retain the structural hooks at a first extent of the translation of the sliding rail and to allow release of the structural hooks at a second, opposite extent of its translation;
    e) an actuation handle and linkage arrangement located at the rear most point of the pick-up truck cargo bed side wall adapted to provide a single point user-operated method of imparting the translation to the sliding lock rail through the predetermined distance;
    wherein the structural hooks are adapted to be integrated into a variety of different pick-up truck cargo bed mounted accessories to facilitate structural retention and simple release of the accessories via movement of the actuation handle.

11. The structural attachment system of claim 10, wherein the pick-up truck cargo bed is provided with a tailgate that is adapted to rotate between an open position and a closed position and is configured with a security pocket that is adapted to interact with the actuation handle so that the structural attachment system is prevented from operation when the pick-up truck tailgate is in its closed position.

12. The structural attachment system of claim 10, wherein the pick-up truck cargo bed is furnished with a pair of castellated retention rails, a pair of sliding lock rails and a pair of actuation handles and linkages, each located within one of the two of the pick-up truck cargo bed side walls.

13. The structural attachment system of claim 12, wherein the pick-up truck cargo bed is provided with a tailgate that is adapted to rotate between an open position and a closed position and is configured with a pair of security pockets that are adapted to interact with the actuation handles so that the structural attachment system is prevented from operation when the pick-up truck tailgate is in its closed position.

14. The structural attachment system of claim 10, wherein the bearing pads are manufactured from a mineral filled nylon or acetal.

* * * * *